Jan. 1, 1963
H. C. FLINT ET AL
3,071,413
SEAT CONSTRUCTION
Filed July 16, 1959
3 Sheets-Sheet 3
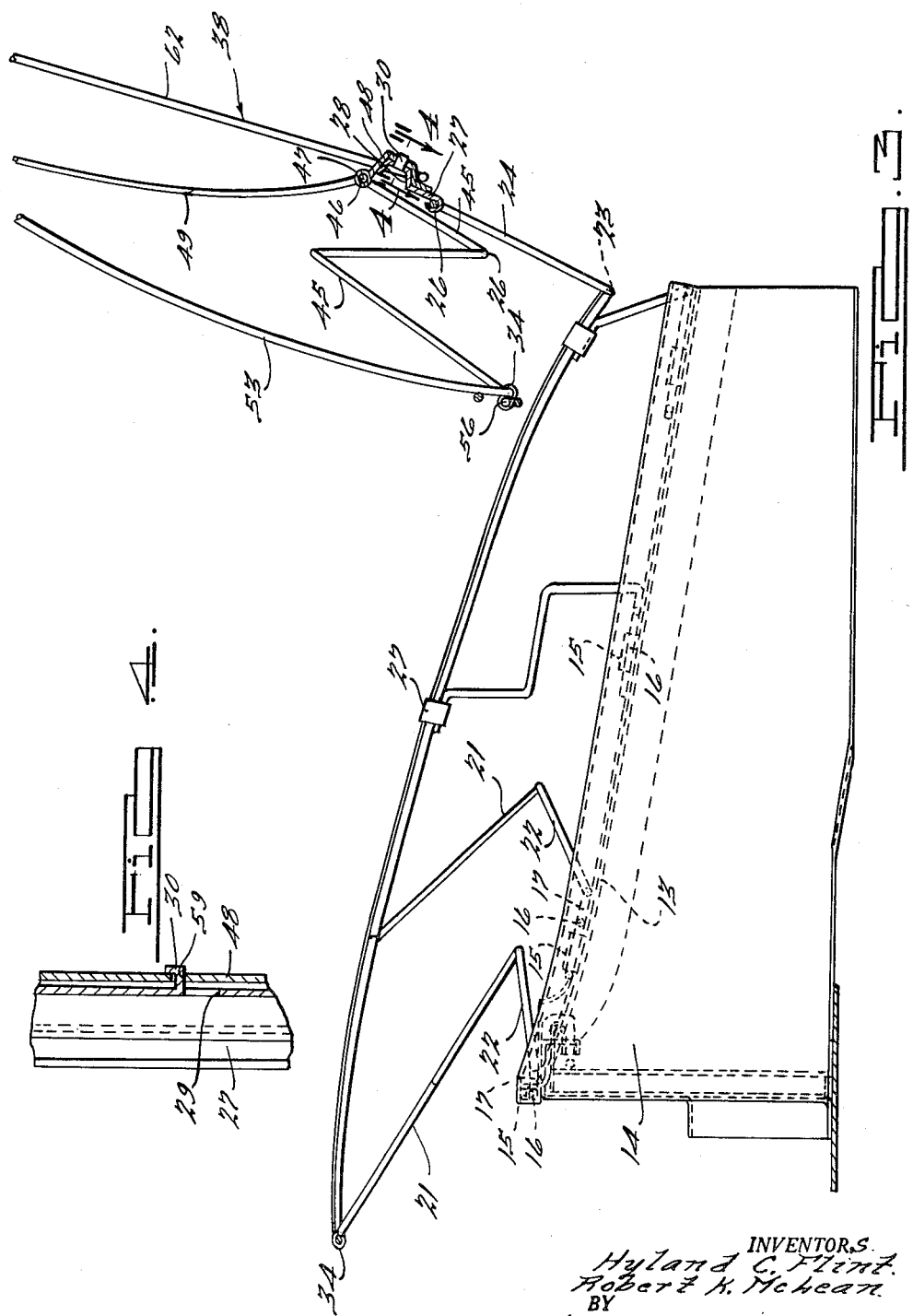
INVENTORS.
Hyland C. Flint.
Robert K. McLean.
BY
Harness, Dickey & Pierce.
ATTORNEYS.

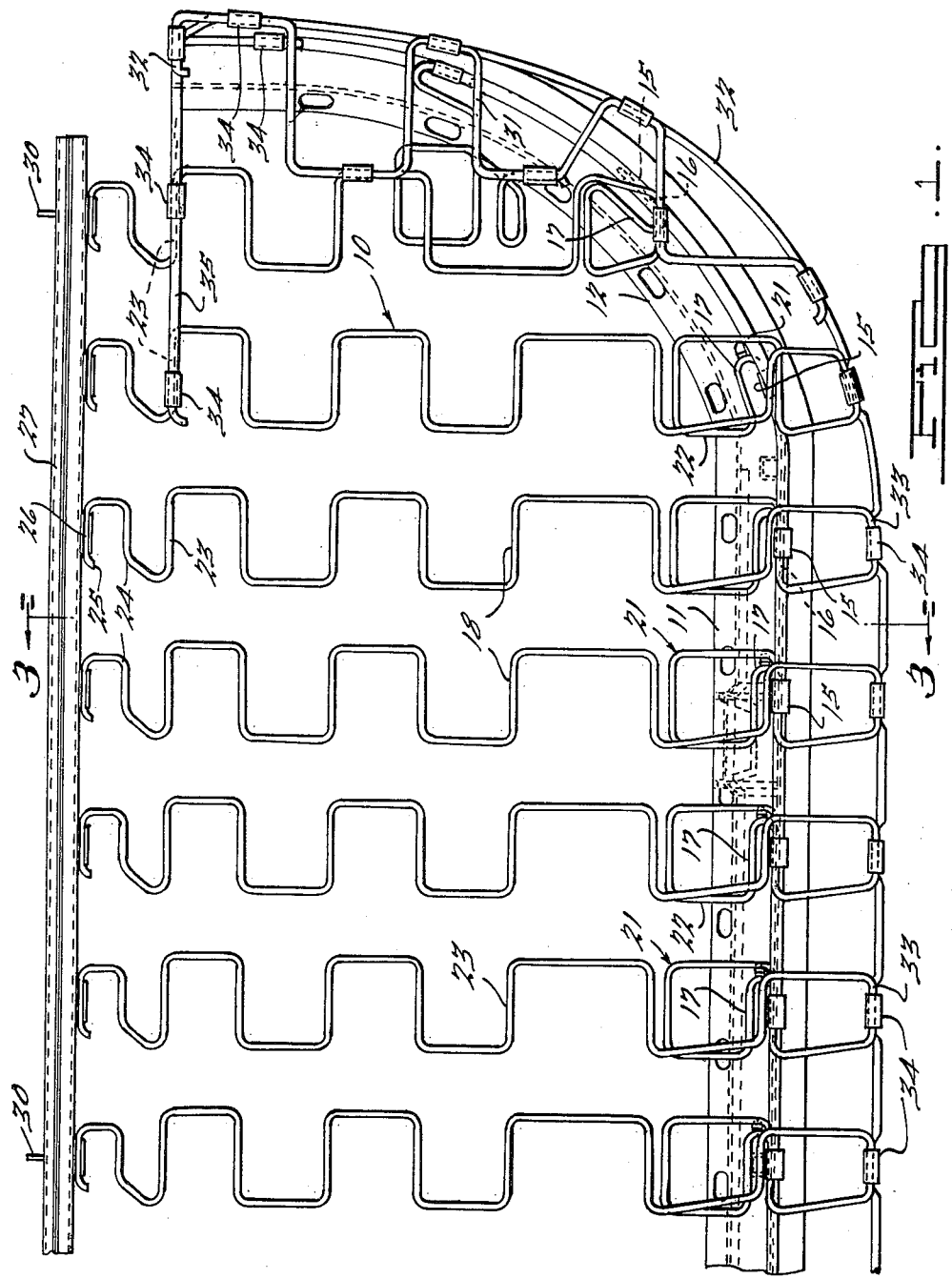

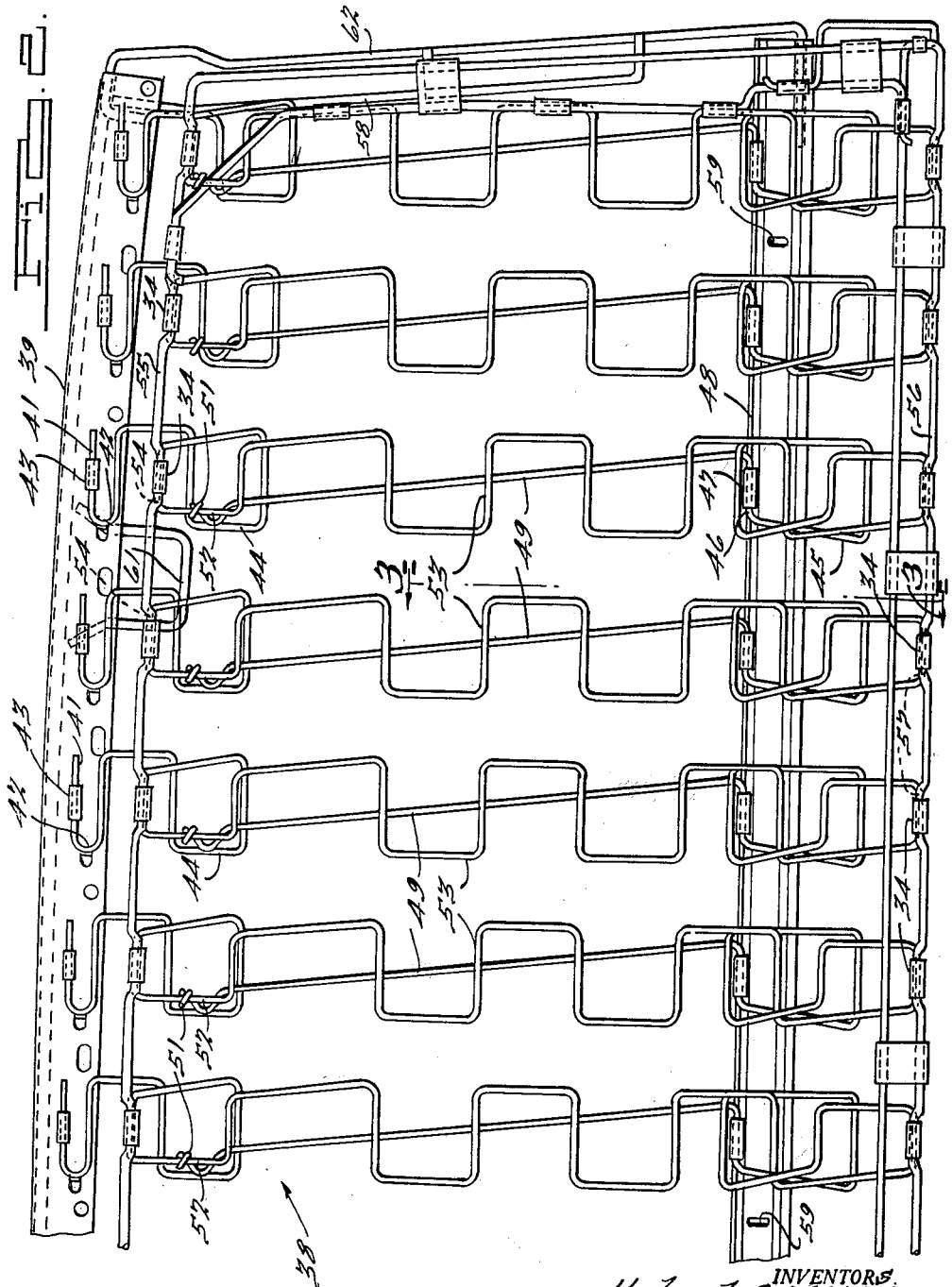

United States Patent Office 3,071,413
Patented Jan. 1, 1963

3,071,413
SEAT CONSTRUCTION
Hyland C. Flint, Novi, and Robert K. McLean, Dearborn, Mich., assignors to American Metal Products Company, Detroit, Mich., a corporation of Michigan
Filed July 16, 1959, Ser. No. 827,561
2 Claims. (Cl. 297—456)

This invention relates to cushions for vehicle seats, and particularly to a seat and back cushion spring assembly which is connected at the adjacent edges of the cushions.

It has been the practice heretofore in the automobile seating art to construct the seat and back cushions individually and to provide independent mounting means therefor. Due to the reduction in vertical space in modern vehicle passenger bodies, it is necessary to construct the seats to provide proper seating height while maintaining roof clearance for the seat occupant. The present invention pertains to the gain of substantial vertical space in the seating area by supporting the rear end of the seat cushion on the lower end of the back cushion in a manner to permit each of the cushions to operate independently of the other. Both cushions are made of sinuous spring strips of oppositely disposed loops of the same or varying width which may be interconnected individually, that is to say, a sinuous spring strip of the back cushion frame could be connected directly to a sinuous spring strip of the seat cushion frame by rigid means which permits pivotal relation between the ends of the strips. The back and seat cushions may have a different number of springs or the same number, and the rear ends of the former and bottom ends of the latter spring strips may be connected to channel-shaped securing strips which nest with each other and which have interrelated parts which lock the strips together. In this manner the seat and back cushions have the springs applied thereto and to the securing strips which will be connected together at the time the cushions are assembled within the vehicle body. The usual padding and upholstering material is added to the spring frames along with the outer trim material prior to assembly within the body before or after the two units are secured together, whichever is most convenient.

Accordingly, the main objects of the invention are to provide seat and back cushion units having sinuous spring strips which are joined together to have the back cushion springs support the rear end of the seat cushion springs; to secure the bottom ends of spring strips of the back cushion and the rear ends of the spring strips of the seat cushion to separate strips which are securable in fixed relation, and in general, to provide a seat and back cushion which are combined to form a seat unit that is low to the floor but which has adequate head room, and Other objects and features of novelty of the invention will be specifically pointed out or will become apparent when referring, for a better understanding of the invention, to the following description taken in conjunction with the accompanying drawings, wherein:

FIG. 1 is a broken plan view of a sprung seat frame embodying features of the present invention;

FIG. 2 is a broken plan view of a sprung back frame, the lower ends of the spring strips of which are attached to a connecting strip;

FIG. 3 is a broken sectional view of seat and back frame units of FIGS. 1 and 2 taken on lines 3—3 thereof illustrated, joined together and with the base in elevation.

FIG. 4 is an enlarged sectional view of the structure illustrated in FIG. 3, taken on the line 4—4 thereof.

Referring to FIG. 1, the seat assembly 10 embodies a supporting frame 11 which is of U-shape having rearwardly extending portions 12 at each side of the assembly. The U-shaped frame 11 is constructed to rest upon a ledge 13 of a base supporting element 14 which is attached to the floor of the vehicle. The frame is constructed to have tunnels 15 in which the ends 16 of the attaching loops 17 at the ends of the spring strips 18 are secured. The spring strips 18 are of the formed type having opposite presenting loops of different widths selected to control the contour of the seating area which results from the pressure exerted by a load resting thereupon. At the front end an S-shaped loop section 21 extends rearwardly from which a forward arm 22 joins with the U-shaped supporting end 17. The laterally extending torsion bar portions 23 near the rear end of each spring strip are twisted to provide an upwardly extending S-shaped end portion 24 having an end 25 which extends in tunnels 26 of a strip 27. The strip 27, as clearly illustrated in FIG. 3, has the tunnel portions 26 extending from a web which is provided with a channel-shaped portion 28. The channel-shaped portion has a plurality of apertures 29 from which a plurality of fingers 30 extend rearwardly for a purpose which will be explained hereinafter. The seat at the side edges has the usual filler and bracing elements 31 and a border wire 32, which border wire extends around the corners and across the front edge to have the forward ends 33 of the load supporting portion of the spring strips 18 secured by banding elements 34. A section of border wire 35 at the rear end is secured to the torsion bars 23 at the rear end of the load supporting portion of the spring strips by bands 34.

In FIG. 2 a back frame 38 is illustrated having a metal strip 39 to which the ends 41 of the supporting loops 42 of the back spring strips 53 are secured in tunnels 43 provided in the strip 39. The back spring strips have V-shaped supporting portions 44 at the top and W-shaped supporting portions 45 at the bottom. The endmost torsion bars 46 of the portions 45 are secured in tunnels 47 on the channel-shaped strips 48, the bars 46 being extended at 49 and secured by a twisted end 51 to a bendable bar 52 at the rear of the load supporting portion of the back spring strips 53. The ends 54 of the load supporting portion of the spring strips are secured by bands 34 to a top border wire 55, a bottom border wire 56 being secured to the endmost torsion bars 57 of the load supporting portion of the spring strips 53 by bands 34. The side edges of the load supporting area of the back cushion are reinforced by edge strengthening and trim wires 58 which are secured thereto in a conventional manner. It will be noted that the strip 48 is of channel section to which the tunnels 47 are secured, the channel being so proportioned as to receive the channel 28 which secures the rear upwardly extended S-shaped portions 24 of the seat spring strips 18 so as to have the end portions secured to the spring strips of the back seat assembly. Strip 48 has apertures 59 therein through which the fingers 30 extend and which are thereafter bent over to firmly secure the two channel-shaped strips in firm fixed relation to each other. It has been pointed out hereinbefore how the seat frame is supported at the front and sides upon the base element 14 and similarly the top strip 39 of the back frame has U-shaped elements 61 thereon which are secured over the rear brace of the vehicle body. The brace supports the rear frame which supports the rear S-shaped portions 24 of the seat spring strips 18. The channel element 48 is prevented from sagging or moving downwardly by the edge wire 62 which is secured thereto. While there is no unison action provided by the interconnection of the seat springs with the back since the channel element 48 is maintained fixed by the side bracing element 62, nevertheless a satisfactory seating and contouring of the spring strips occurs in view of the support at the rear end by the S-shaped portions 24 and the extension of the springs 53 forwardly thereof which thereby provides comfort to the occupant when sitting upon the seat-supporting surface of the seat cushion.

What is claimed is:

1. In a seat construction, a back cushion having a plurality of spring strips extending in a vertical direction, a seat cushion construction having a plurality of spring strips extending from the front to the rear, means for supporting the rear ends of the seat cushion spring strips on the lower ends of the back cushion spring strips, said supporting means embodying a first strip of material connecting all of the ends of the seat cushion spring strips at the rear end thereof, a second strip of material connecting the lower ends of the back cushion spring strips, and means for connecting said strips together after the spring strips have been attached to the respective strips of material.

2. In a seat construction, a back cushion having a plurality of spring strips extending in a vertical direction, a seat cushion construction having a plurality of spring strips extending from the front to the rear, means for supporting the rear ends of the seat cushion spring strips on the lower ends of the back cushion spring strips, said supporting means embodying a first strip of material connecting all of the ends of the seat cushion spring strips at the rear end thereof, a second strip of material connecting the lower ends of the back cushion spring strips, and means for connecting said strips together, said strips of material being of channel section so related that one section telescopes relative to the other.

References Cited in the file of this patent

UNITED STATES PATENTS

| 1,879,724 | Wolpert | Sept. 27, 1932 |
| 2,133,747 | Hunter | Oct. 18, 1938 |
| 2,165,306 | Shanahan | July 8, 1939 |
| 2,177,363 | Flint | Oct. 24, 1939 |
| 2,260,981 | Shanahan | Oct. 28, 1941 |
| 2,286,168 | Flint et al. | June 9, 1942 |
| 2,466,345 | Wyeth | Apr. 5, 1945 |
| 2,855,984 | Majorana et al. | Oct. 14, 1958 |
| 2,936,823 | Neely | May 17, 1960 |
| 2,965,154 | Aisenstein | Dec. 20, 1960 |

FOREIGN PATENTS

| 254,466 | Switzerland | Apr. 30, 1948 |